United States Patent [19]

Doriath

[11] Patent Number: 5,003,313
[45] Date of Patent: Mar. 26, 1991

[54] METHOD AND ARRANGEMENT FOR IMPROVING THE ANGULAR RESOLUTION OF A MONOPULSE RADAR

[75] Inventor: Georges Doriath, Malakoff, France
[73] Assignee: Thomson-CSF, Paris, France
[21] Appl. No.: 559,046
[22] Filed: Nov. 29, 1983
[30] Foreign Application Priority Data
Nov. 30, 1982 [FR] France .............................. 82/20047
[51] Int. Cl.$^5$ ............................................. G01S 13/44
[52] U.S. Cl. ..................................... 342/152; 342/149
[58] Field of Search .............. 343/16 M; 342/149, 152
[56] References Cited
U.S. PATENT DOCUMENTS

| | | | |
|---|---|---|---|
| 3,747,097 | 7/1973 | Howard | 342/80 |
| 4,220,955 | 9/1980 | Carre | 342/94 |
| 4,296,413 | 10/1981 | Pelton et al. | 342/94 |
| 4,345,252 | 8/1982 | Carre et al. | 342/91 |
| 4,524,359 | 6/1985 | Champagne | 342/89 |

Primary Examiner—Gilberto Barron, Jr.
Attorney, Agent, or Firm—Cushman, Darby & Cushman

[57] ABSTRACT

The invention relates to a method for improving the angular resolution of a monopulse radar.

Starting from the sum signal S, a direction signal $\theta_b$, and a signal representing the quadrature angle-error measurement $|\epsilon_q\epsilon|$, the method consists of calculating in a first device 201 a signal $\Delta\theta$ representing the wingspan of the target, then of calculating in a second device 202 two measuring signals $\theta_A$ and $\theta_B$ representing respectively the direction of the external limits of the target, as well as a signal Q representing the quality of these measurements and finally of carrying out an adaptive filtering operation on the measurements in a third device 203, in order to obtain filtered estimates for $\hat{\Delta\theta}$, $\hat{\theta}_A$ and $\hat{\theta}_B$.

15 Claims, 7 Drawing Sheets

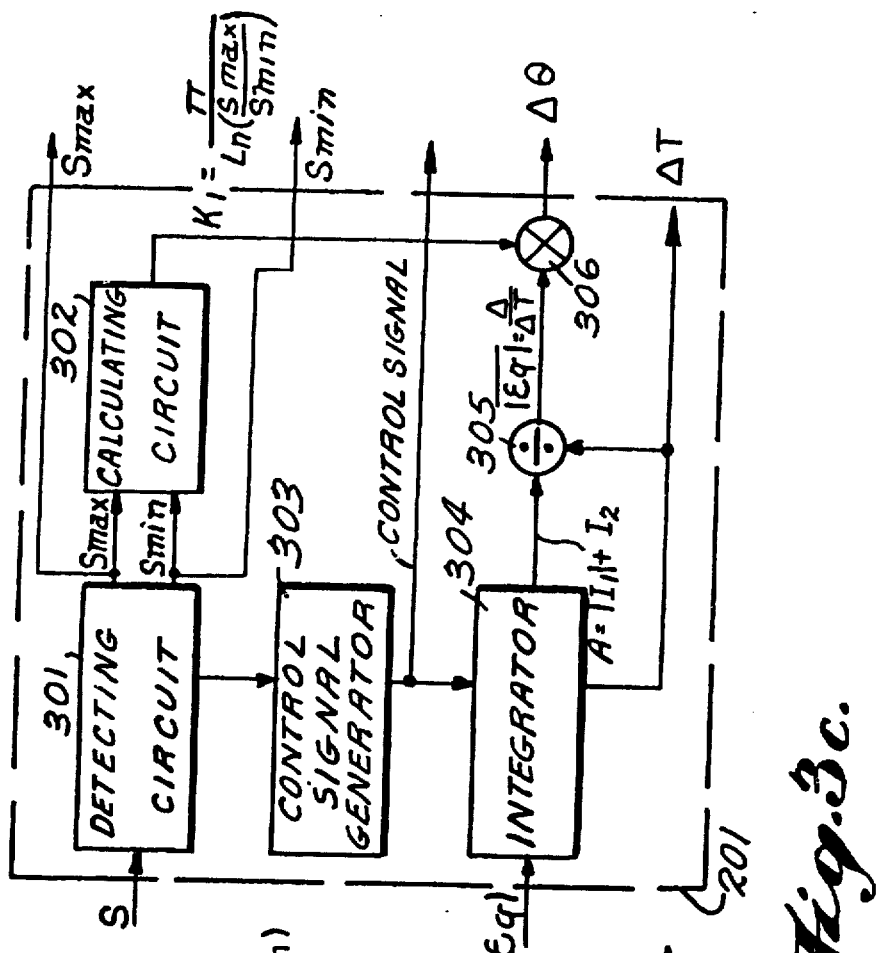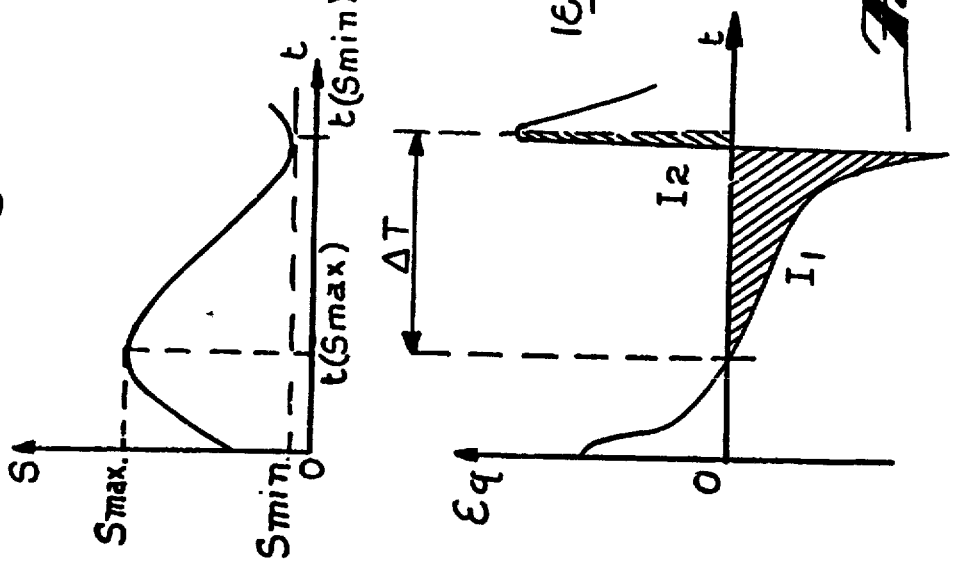

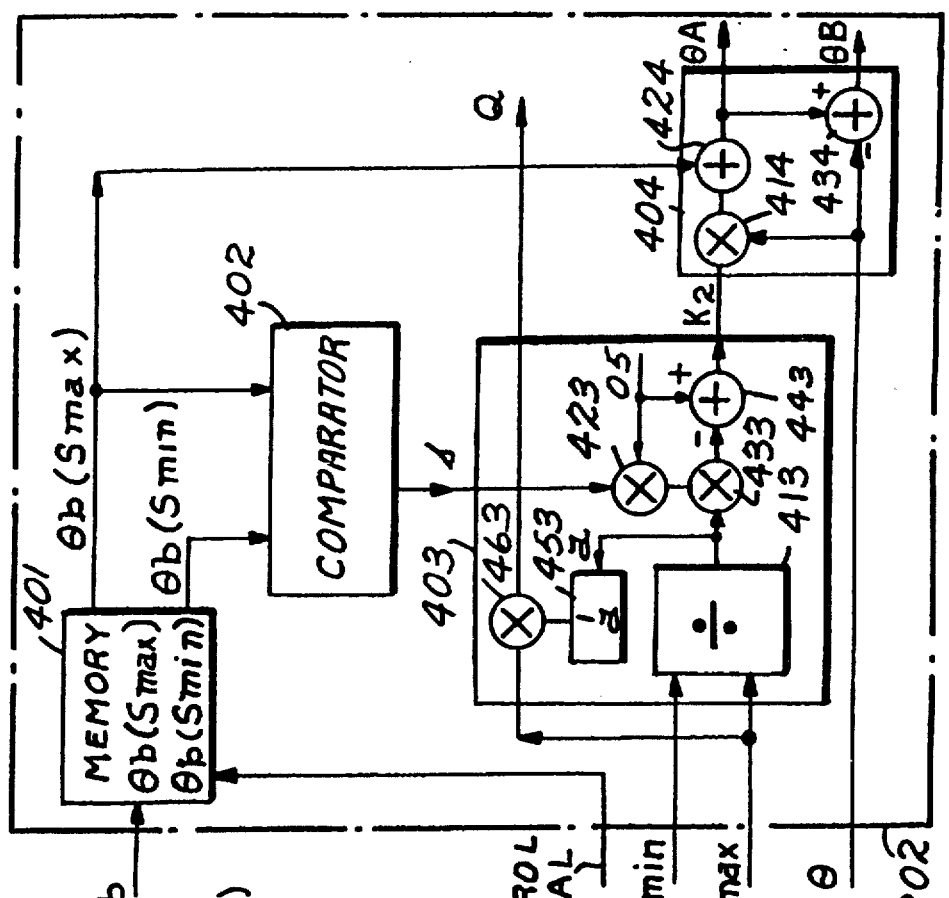
Fig. 4a.
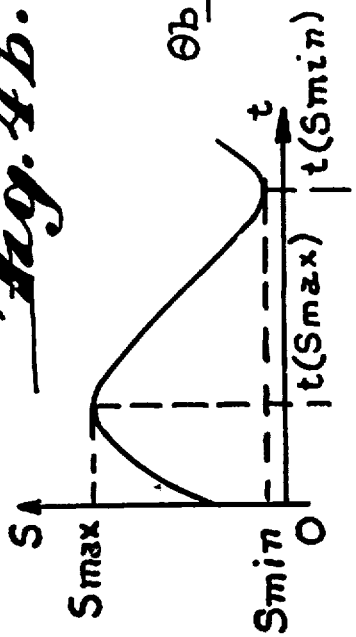
Fig. 4b.
Fig. 4c.

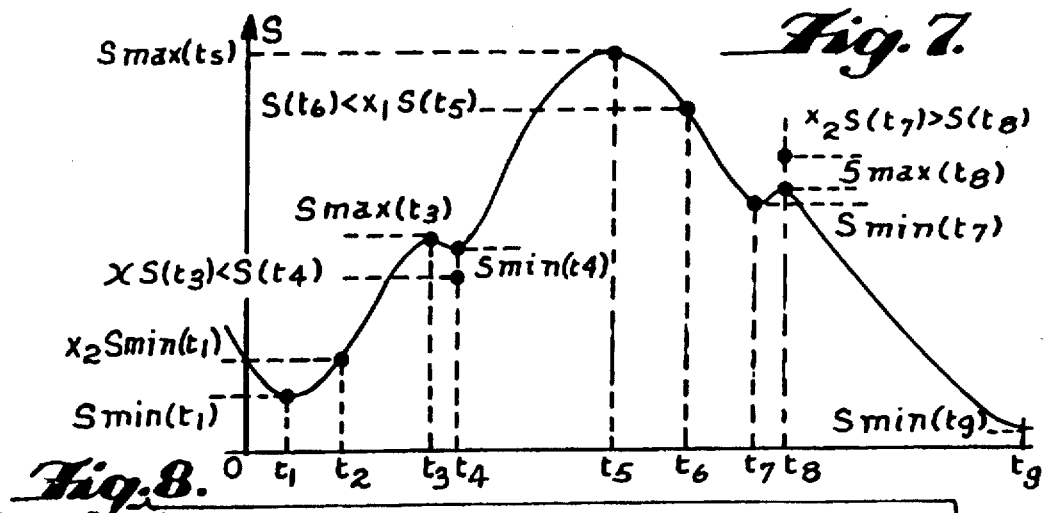
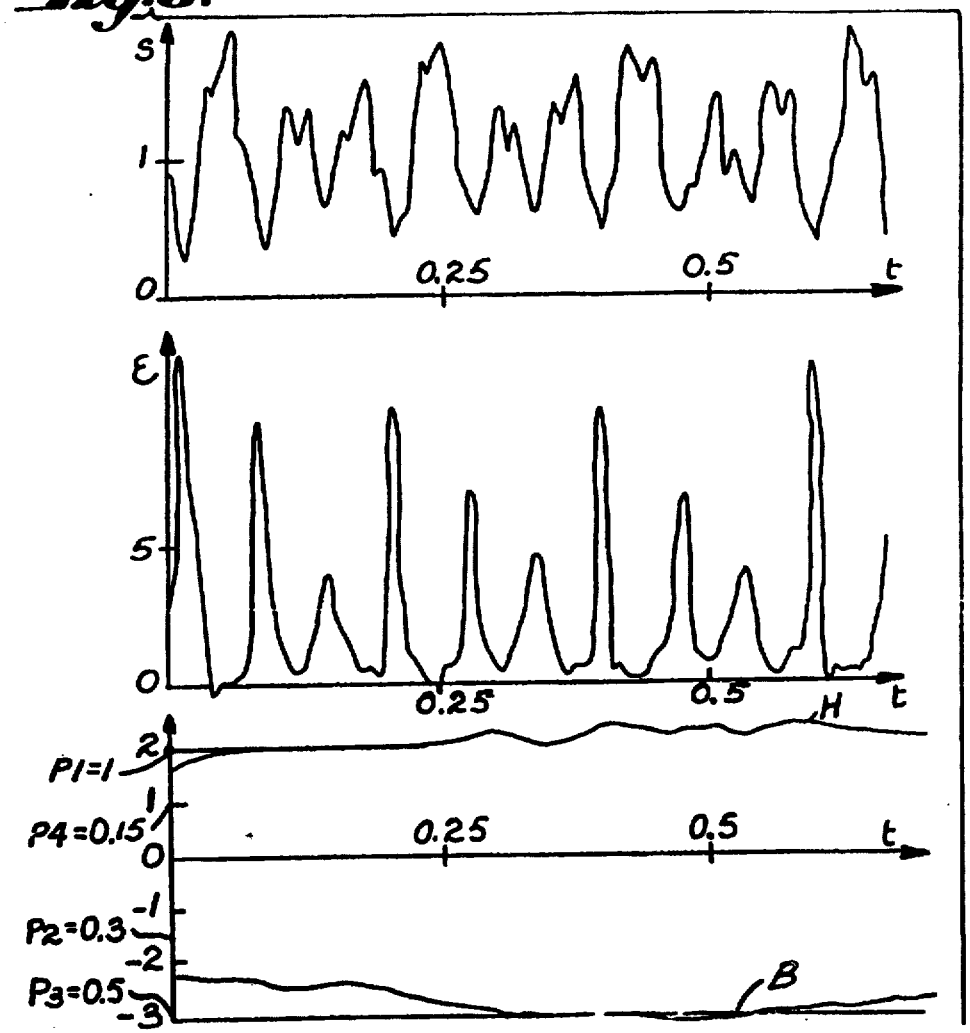

METHOD AND ARRANGEMENT FOR IMPROVING THE ANGULAR RESOLUTION OF A MONOPULSE RADAR

BACKGROUND OF THE INVENTION

The present invention relates to a method which permits the resolution of a monopulse radar to be improved by processing the various signals which are obtained, in the conventional manner, in a radar of this type. The invention likewise relates to an arrangement which can be assigned to a monopulse radar in order to implement this method.

It is known that, with the aid of two receivers which are arranged in a manner such that their axes of reception are slightly out of alignment with the axis of transmission, a monopulse radar is capable of providing two separate signals, one of which corresponds to the sum of the signals received by the two receivers and gives the same indications as a conventional radar, while the other signal corresponds to the difference of these two signals and gives a difference-signal which enables the error-angle between the direction of the detected target and the antenna axis to be measured.

When the detected target is complex and is composed of several reflecting zones, known as bright points, either because of its shape or because of the fact that it is composed of several separate objects, the signals delivered by the monopulse radar are observed to be subject to significant fluctuations. These fluctuations, known as glint, are due to interference effects between the waves, which are reflected by the various bright points, and are capable of giving rise to incorrect indications or even grossly misleading indications.

Two distinct types of arrangement have been used in order to avoid this phenomenon.

The first type of arrangement, corresponding for example to French Patent 2,396,311, in the name of the Applicant Company, is known as an antiglint device. It utilizes the strong correlations between the sum channel, a conventional angle-error channel and an additional angle-error channel, which is called quadrature angle-error channel and corresponds to the imaginary part of the complex difference-signal, the real part of the latter corresponding to the conventional angle-error channel.

These correlations enables an effective adaptive-filtering procedure to be set up, which enables a direction to be determined, corresponding in fact to the center of mass of the bright points of the target.

When this target is on its own, this center of mass is, as a rule, situated inside the target, this fact justifying the interest in antiglint devices of this nature, of which numerous embodiments are known.

However, no further information are available regarding the dimensions of the detected target, which would be particularly important if the target is composed of several separate objects, such as aircrafts making up a squadron. The ultimate objective is to open fire at these aircrafts; but in this case there is every chance of firing at empty space: For example a missile which is guided by a device of this type will pass between two aircrafts, which are detected simultaneously, without touching either of them.

The second type of arrangement utilizes the fact that the bright points of a target approach or move off with a velocity relative to the radar antenna, corresponding to a Doppler effect which is particular to each bright point. The velocity of each bright point is associated with its position in the target, and the analysis of the Doppler spectrum from the whole of the target may therefore make it possible, at least in theory, to measure the velocity of each of the bright points and thus to reconstitute the overall dimensions of the target.

In order to obtain this result, it is nevertheless necessary to carry out a highly discriminatory spectral resolution procedure on the Doppler spectrum of the received signal, this procedure on the one hand being very difficult and on the other hand necessitating a very large number of calculations which have to be performed very rapidly: This second method has not given rise to satisfactory embodiments.

the invention proposes to process the fluctuations in the angle-error signals in order to extract from then the information corresponding to the external dimensions of the target, without seeking solely to reduce these fluctuations, as in the case of the conventional antiglint devices. For that purpose, a model of the target is produced, by reducing it to the two principal bright points at the greatest distances from its center of mass. By then processing simultaneously the sum channel, the conventional angle-error channel and the quadrature angle-error channel between two consecutive extreme values of the sum channel, a measurement of the wingspan of the target is obtained together with a measurement of the directions of the two bright points representing the target.

SUMMARY OF THE INVENTION

In the method according to the invention, starting from sum signal S, direction signal $\theta_b$ and quadrature angle-error signal $\epsilon q$, the following operations are carried out in order to obtain a signal $\Delta\theta$ which is a measurement of the wingspan of the target:

detection of two successive extreme values of S: S max and S min;

measurement of the time interval $\Delta T$ separating S max from S min;

integration of $|\epsilon q|$ over the time interval $\Delta T$;

division by $\Delta T$ of the result of this integration, in order to obtain the mean value of $|\epsilon q|$, namely $\overline{|\epsilon q|}$, over the time interval $\Delta T$;

calculating of a coefficient $$k_1 = \frac{\pi}{Ln\left(\frac{S\,max}{S\,min}\right)};$$

(Ln = Neperian Logarithm)

multiplication of $k_1$ by $\overline{|\epsilon q|}$, which operation yields the value of $\Delta\theta$.

BRIEF DESCRIPTION OF THE DRAWINGS

Other features and advantages of the invention will clearly appear from the following description presented by way of a non-limiting example and written by reference to the figures which are attached and in which:

FIGS. 3a, 3b and 3c represent respectively the block diagram of the circuit 201 shown in FIG. 2 and two curves which represent the input signals of this circuit;

FIGS. 4a, 4b and 4c represent respectively the block diagram of the circuit 202 shown in FIG. 2, and two curves which represent input signals of this circuit;

FIG. 7 shows a curve representing the signal S over a time interval sufficient for defining the signals used in the description of the modes of operation of the circuits shown in FIG. 6;

FIG. 8 shows curves representing the experimental measurements of the sum and difference signals, and the estimation of the external boundaries of the target.

DESCRIPTION OF PREFERRED EMBODIMENTS

Figure 1:
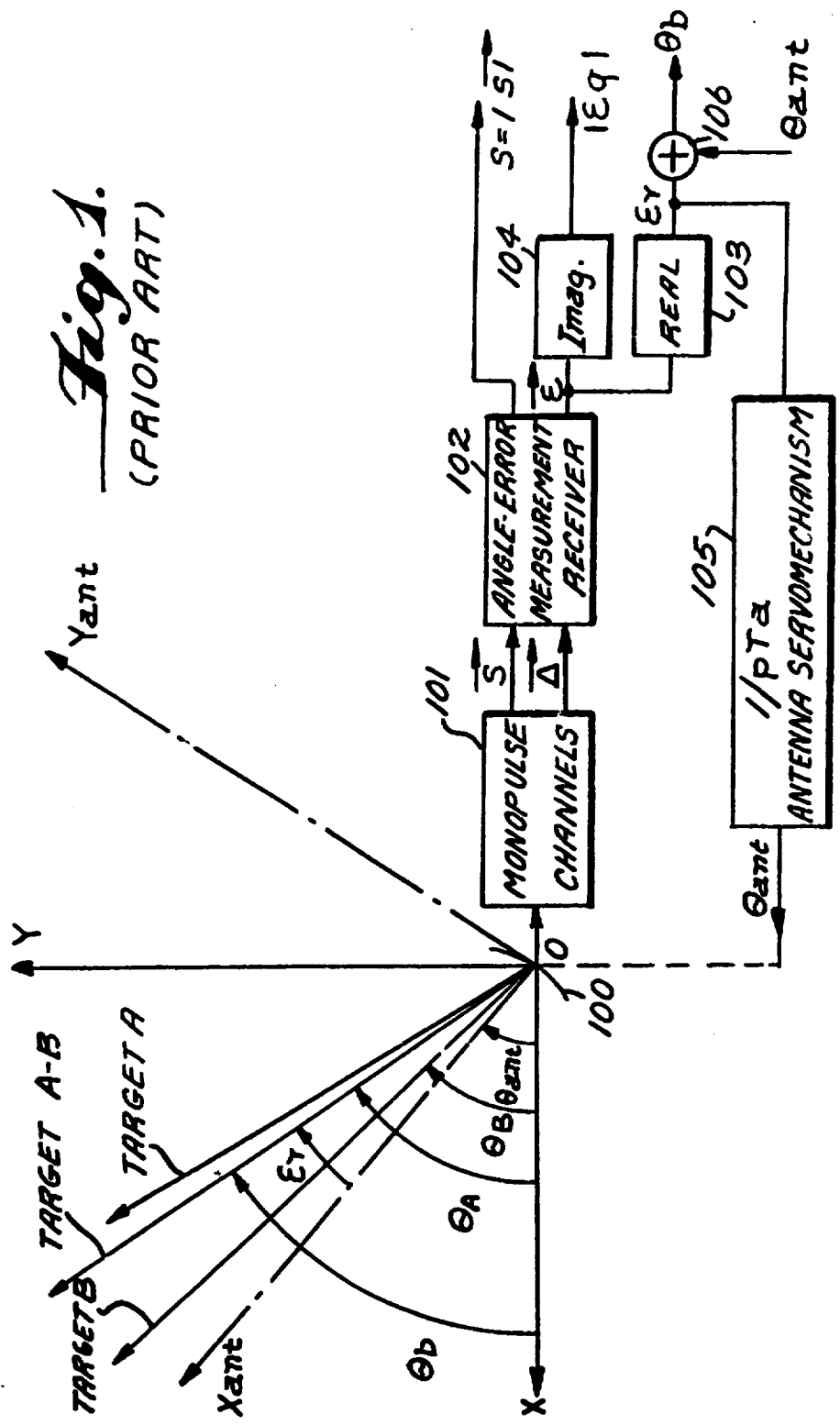
FIG. 1 represents the block diagram of a known monopulse radar, this diagram enabling the quantities and the signals utilized in the invention to be defined.

In a monopulse radar—the diagram of which is reproduced in FIG. 1 in which definitions of the quantities to be measured have likewise been represented—the measurements take place in two planes, as a rule in elevation and bearing, in order to locate the target in space. These two planes are treated in the same way and the remainder of this description has therefore been limited to only one of these planes, it being understood that for the other plane the corresponding arrangement and treatment are identical.

On the FIG. 1 an antenna 100 is defined by two perpendicular axes $X_{ant}$ and $Y_{ant}$ which are associated with it. It is mobile within a plane XOY defined by two fixed axes.

The orientation of the antenna is measured by an angle $\theta_{ant}$, between the axes X and $X_{ant}$, and the direction of two elementary targets or bright points A and B, which have been detected by the radar, is measured, relatively to the axis X, by the angles $\theta_A$ and $\theta_B$ respectively. The direction of the radioelectric center of mass of the two bright points A and B, corresponding to the direction measured by a device of the antiglint type, is measured by the angle $\theta_b$, relatively to the axis X. In the coordinates of the axes which are associated with the antenna, this angle $\theta_b$ corresponds to the angle $\epsilon_r$.

The signals received by the antenna are processed in the reception circuits of the radar 101, which delivers signals representing a sum channel S and a difference channel $\vec{\Delta}$ (the arrow indicating that complex quantities are involved).

These two channels are processed in an angle-error signal receiver 102, which delivers on the one hand a sum signal S and on the other hand a complex angle-error signal:

$$\epsilon = \frac{\vec{S} \cdot \vec{\Delta}^*}{|\vec{S}|^2}$$

in which formula the * sign in the exponent designates the conjugate vector.

This complex angle-error signal is processed in two circuits 103 and 104 which are capable of delivering respectively the signals corresponding to the real and imaginary parts of the complex signal.

The real part $\epsilon_r$ is the conventional angle-error signal which is provided by the known monopulse radars.

The imaginary part $\epsilon_q$ is a signal called quadrature angle-error signal.

It is known that the signal $\epsilon_r$ in fact is a measurement of the angular deviation of the target and more precisely of the radioelectric center of mass of the target relatively to the antenna axis. As this direction varies during the radar tracking process the value $\theta_b$ of the angle between the direction of the target and the fixed axis OX will be used in the remainder of this text.

Relative to this axis, the direction of the antenna is given by angle $\theta_{ant}$. The direction signal $\theta_b$ is therefore obtained from the relationship:

$$\theta_b = \epsilon_r + \theta_{ant}$$

A measuring signal $\theta_{ant}$ can be obtained starting from the antenna orientation servomechanism 105, for which the transfer function is obtained, by using the Laplace transform, by the formula $$\frac{1}{pTa}.$$

This servomechanism 105 operates from the input signal $\epsilon_r$ and delivers a signal which controls the antenna-orientation motors and which represents a measurement of $\theta_{ant}$.

Under these conditions, $\theta_b$ will be obtained by means of the formula:

$$\theta_b = \epsilon_r \times \frac{1 + pTa}{pTa}$$

When the pattern of the target is formed by two bright points A and B, the directions of which are measured by the angles $\theta_A$ and $\theta_B$ relative to the axis OX, the complex sum and difference signals corresponding to the radioelectric center of mass of these two bright points can be expressed as follows:

$$\vec{S} = m_A + m_B e^{j\Delta\phi}$$

$$\vec{\Delta} = m_A(\theta_A - \theta_{ant}) + m_B(\theta_B - \theta_{ant}) e^{j\Delta\phi}$$

in which expressions $m_A$ and $m_B$ are the respective reflection coefficients at the bright points, and $\Delta\phi$ is the phase-difference between the waves reflected by these points.

$\theta_b$ is obtained by summing $\epsilon_r$ and $\theta_{ant}$ in the adder 106.

this enables the values of S, $\epsilon_r$, $\epsilon_q$ and $\theta_b$ to be calculated, which are given by the expressions:

$$S = \sqrt{m_A^2 + m_B^2 + 2m_A m_B \cos \Delta\phi}$$

$$\epsilon_r = \frac{m_A^2 \theta_A + m_B^2 \theta_B + 2 m_A m_B (\theta_A + \theta_B) \cos \Delta\phi}{m_A^2 + m_B^2 + 2 m_A m_B \cos \Delta\phi} - \theta_{ant}$$

$$\epsilon_q = (\theta_A - \theta_B) \frac{m_A m_B \sin \Delta\phi}{m_A^2 + m_B^2 + 2 m_A m_B \cos \Delta\phi}$$

$$\theta_b = \frac{m_A^2 \theta_A + m_B^2 \theta_B + 2 m_A m_B (\theta_A + \theta_B) \cos \Delta\phi}{m_A^2 + m_B^2 + 2 m_A m_B \cos \Delta\phi}$$

It is clear that these measurement fluctuate as a function of the variations in $\Delta\phi$, these variations precisely corresponding in fact to the well-known phenomenon of glint.

Moreover, it is observed that the quadrature angle-error signal $\epsilon_q$ is proportional to the angular deviation $\Delta\theta = |\theta_A - \theta_B|$ separating the two bright points.

By processing the channel carrying the quadrature angle error measurement, the invention permits a measurement of $\Delta\phi$ to be obtained. Starting from this measurement the invention then permits, by utilizing the sum channel and the angle-deviation $\theta_b$ the position of the points A and B to be completely reconstituted.

Figure 2:
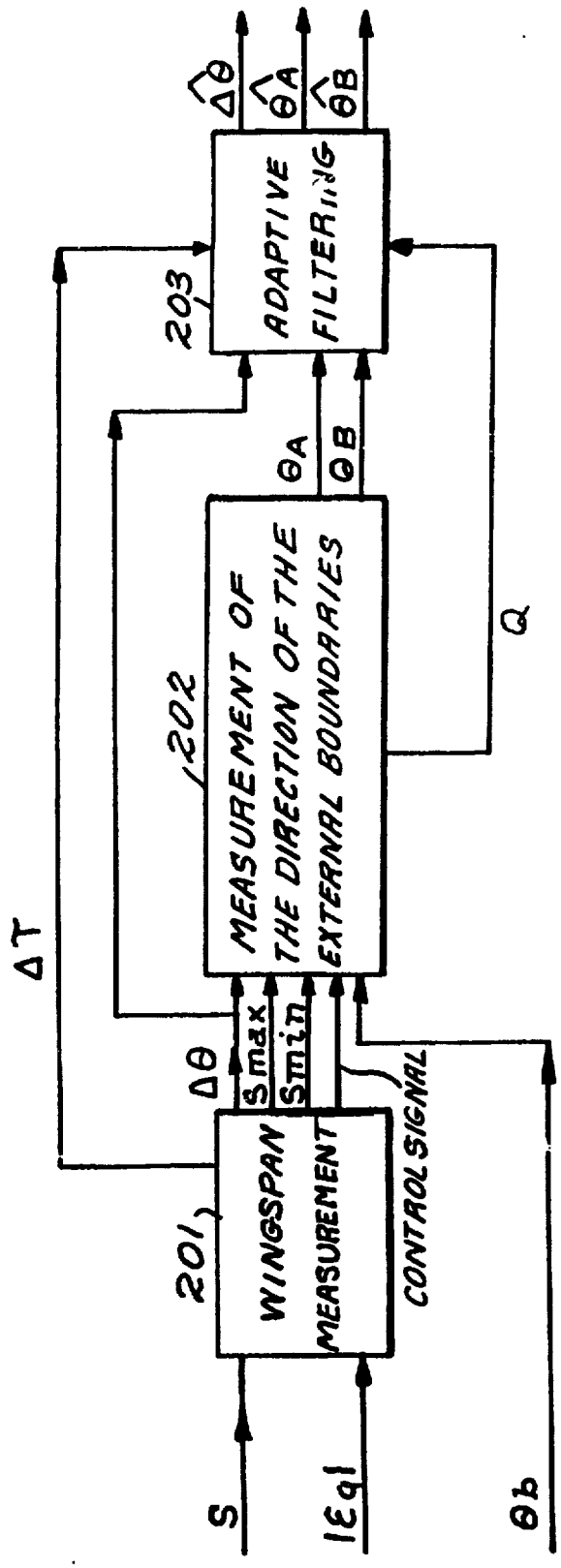
FIG. 2 represents the block diagram of an arrangement according to the invention.

An arrangement which enables this processing to be carried out is represented in FIG. 2.

It includes a first circuit 201 which permits the wingspan of the target to be measured, starting from the amplitude S of the sum signal and from the modulus of the quadrature angle-error measurement, obtained by rectifying of the signal $\epsilon_q$. This measurement of the wingspan is delivered in the form of a signal $\Delta\theta$.

A second circuit 202 makes it possible to measure the directions of the two bright points on the exterior of the target, which represent in theory its external boundaries. This measurement is carried out from the signal $\Delta\theta$ supplied by the circuit 201, from the signal S and from the signal $\theta_b$, which measures the direction of the target. The measurements of the directions of the two bright points are delivered by the circuit 202, in the form of two signals $\theta_A$ and $\theta_B$. At the same time, the circuit 202 supplies an estimation of the quality of these two signals, in the form of a quality signal Q.

As the signals which are provided by the circuits 201 and 202 are themselves affected by significant fluctuations, they are subjected in a circuit 203 to an adaptive-filtering procedure which is capable of providing a filtered estimation of these measurements, in the form of three signals $\Delta\theta$, $\theta_A$ and $\theta_B$. The matching of this filter is adjusted by varying its gain, under the control of the quality signal Q.

Calculation shows that, between two successive extreme values of the signal S, which are denoted S max and S min, the mean value of the rectified quadrature angle-error signal $\epsilon_q$ is defined by the expression:

$$\overline{|\epsilon_q|} = \frac{\Delta\theta}{\pi} \operatorname{Ln}\left(\frac{Smax}{Smin}\right)$$

$\Delta\theta$ can therefore be expressed in terms of $\epsilon_q$, $S_{max}$ and $S_{min}$ by the formula:

$$\Delta\theta = \pi \frac{\overline{|\epsilon_q|}}{\operatorname{Ln}\left(\frac{Smax}{Smin}\right)}$$

this formula explaining the processing which is performed by the circuit 201 in FIG. 2.

An embodiment of this circuit 201 is represented in FIG. 3a with reference to the FIGS. 3b and 3c, which represent the variations of the signals S and $\epsilon_q$ as a function of time, with the indication of the points between which the measurements are made.

The signal S is applied to a circuit 301 which enables the extreme values of this signal to be detected, and which also contains two memories, one of which is assigned to the value S max and the other to the value $S_{min}$.

Starting for example at an instant t (S max), at which S attains the value S max, the memory containing this values is set, while the information stored in the other memory is continuously updated by successive values of the signal S, up to the instant t (S min) at which the circuit detects that S is passing through the value S min.

At this instant, the two values, S max and S min, which are then available, are transmitted to a calculating circuit 302 which determines a coefficient $k_1$, such that:

$$k_1 = \frac{\pi}{\operatorname{Ln}\left(\frac{Smax}{Smin}\right)}$$

Such a calculation is extremely simple and can be carried out for example by means of a suitably programmed microprocessor of type 6800.

After this instant, the memory assigned to S min is set, while the information stored in the memory assigned to S max is updated by the signal S, until the new signal S max is detected.

In the process of detecting the extreme values, the circuit 301 determines on its own the instants t (S max) and t (S min). These instants are transmitted to a circuit 303 which synthesizes control signals which permit the functioning of the whole of the arrangement to be synchronized.

In order to obtain the mean value to the modulus of $\epsilon_q$ (required for the calculation of $\Delta\theta$), an integrator 304 is used which receives on the one hand the rectified signal $\epsilon_q$ and on the other hand the signals from the control circuit 303 which indicate to it the instants between which the integration is to be performed.

An example of the signal $\epsilon_q$ is given in FIG. 3c, where it will be noticed that this signal comprises a negative portion delimiting an area $I_1$ and a positive portion delimiting an area $I_2$. The integration consists of performing the calculation of these two areas and of adding them in order to obtain the signal $A = |I_1| - I_2$.

By comparing the signals t (Smax) and t (S min), the integrator likewise provides the duration $\Delta T$ between these two instants. This duration is available for the adaptive-filtering circuit 203, and enables the mean value of $|\epsilon_q|$ to be calculated in a divider 305, this value being equal to $$\frac{A}{\Delta T}.$$

Since therefore this mean value and the coefficient $k_1$ are thus available the wingspan $\Delta\theta$ of the target is obtained by forming in a multiplier 306 the product of the output signals of the computer 302 and of the divider 305.

The calculation shows that the directions of the bright points on the exterior of the target are associated with the values of the measured directions $\theta_b$ of this target at the instants when the sum signal passes through extreme values. The measurements $\theta_A$ and $\theta_B$ of these directions are then given by the formulae:

$$\theta_A = \theta_b (S\,max) + k_2 \cdot \Delta\theta$$

$$\theta_B = \theta_A - \Delta\theta$$

Where the coefficient $k_2$ is given by:

$$k_2 = \frac{1}{2}\left[1 - \frac{S\,min}{S\,max} \times \text{Sign}\,(\theta_{b(Smin)} - \theta_{b(Smax)})\right]$$

FIG. 4a represents an embodiment of the circuit 202 of FIG. 2, which enables the angles $\theta_A$ and $\theta_B$ to be calculated. FIGS. 4b and 4c, represent respectively the variations of S and of $\theta_b$ as a function of time, with the indications of the points between which the measurements are made.

A first circuit 401, containing two memories, receives the signal $\theta_b$ and from the circuit 303 a control signal which indicates the instants at which the signal S assumes the values S max and S min. This enables the storage of the values of $\theta_b$ at these instants, namely $\theta_{b(Smax)}$ and $\theta_{b(Smin)}$.

A comparator 402, compares these values and delivers a signal s which has the value +1, if $\theta_{b(Smax)}$ exceeds $\theta_{b(Smin)}$, and −1, if the opposite occurs.

This signal s, together with the signals S max and S min coming from the circuit 301 shown in FIG. 2, are applied to a circuit 403 which enables the coefficient $k_2$, defined earlier in this test, to be calculated.

In order to effect this calculation, S min and S max are applied to a divider 413, which proceeds to calculated $$\frac{S\,min}{S\,max}$$

and delivers a signal a which represents the result of this calculation. The signal s is multiplied by a signal which has a constant value of 0.5 in a multiplier 423 and the result of this operation is applied to a multiplier 433 which likewise receives the signal a. Finally a subtracter 443 receives at its positive input the signal which has a constant value of 0.5 and which is also applied to an input of the multiplier 423, and at its negative input the output signal from the multiplier 433. The desired coefficient $k_2$ is therefore obtained at the output of this subtracter 443.

The signal $\theta_{b(S\,max)}$ delivered by the circuit 401 is likewise applied to a circuit 404, which also receives the coefficient $k_2$ and the signal $\Delta\theta$ which is obtained at the output of the multiplier 306 shown in FIG. 3.

In this circuit 404 the signal $\Delta\theta$ is multiplied by the coefficient $k_2$ in a multiplier 414. The result of this multiplication is added, in an adder 424, to the signal $\theta_{b(S\,max)}$ and this adder delivers the signal $\theta_A$, which measures the direction of the bright point A.

This signal $\theta_A$ which is available at an output of the circuit 404 is likewise applied in this circuit to the positive input of a subtracter 434 which also receives the signal $\Delta\theta$ at its negative input. This subtracter delivers the signal $\theta_B$, which measures the direction of the bright point B.

As the signal a is available in the circuit 403 this circuit also calculates relatively to the measurements performed a quality-coefficient which is defined by the expression $$Q = \frac{(S\,max)^2}{S\,min}.$$

In order to effect this calculation, the signal a is inverted, in an inverter 453, and is then applied to a multiplier 463 which also receives the signal S max and delivers the signal Q.

The quality-coefficient Q is an effective indication of the quality of the measurements, as in fact it depends directly on the quality of the selection of the extreme values on the sum channel: the higher the ratio of a maximum value to a minimum value on this channel is the better the selection. Moreover, this quality is improved in proportion to the signal/noise ratio and when the measurements therefore correspond for a given ratio $$\frac{S\,max}{S\,min}$$

to a maximum value of S max. Thus, by taking the product of the ratio $$\frac{S\,max}{S\,min}$$

and of S max, the resulting value effectively maximizes the two criteria which have been defined in the above manner.

Figure 5:
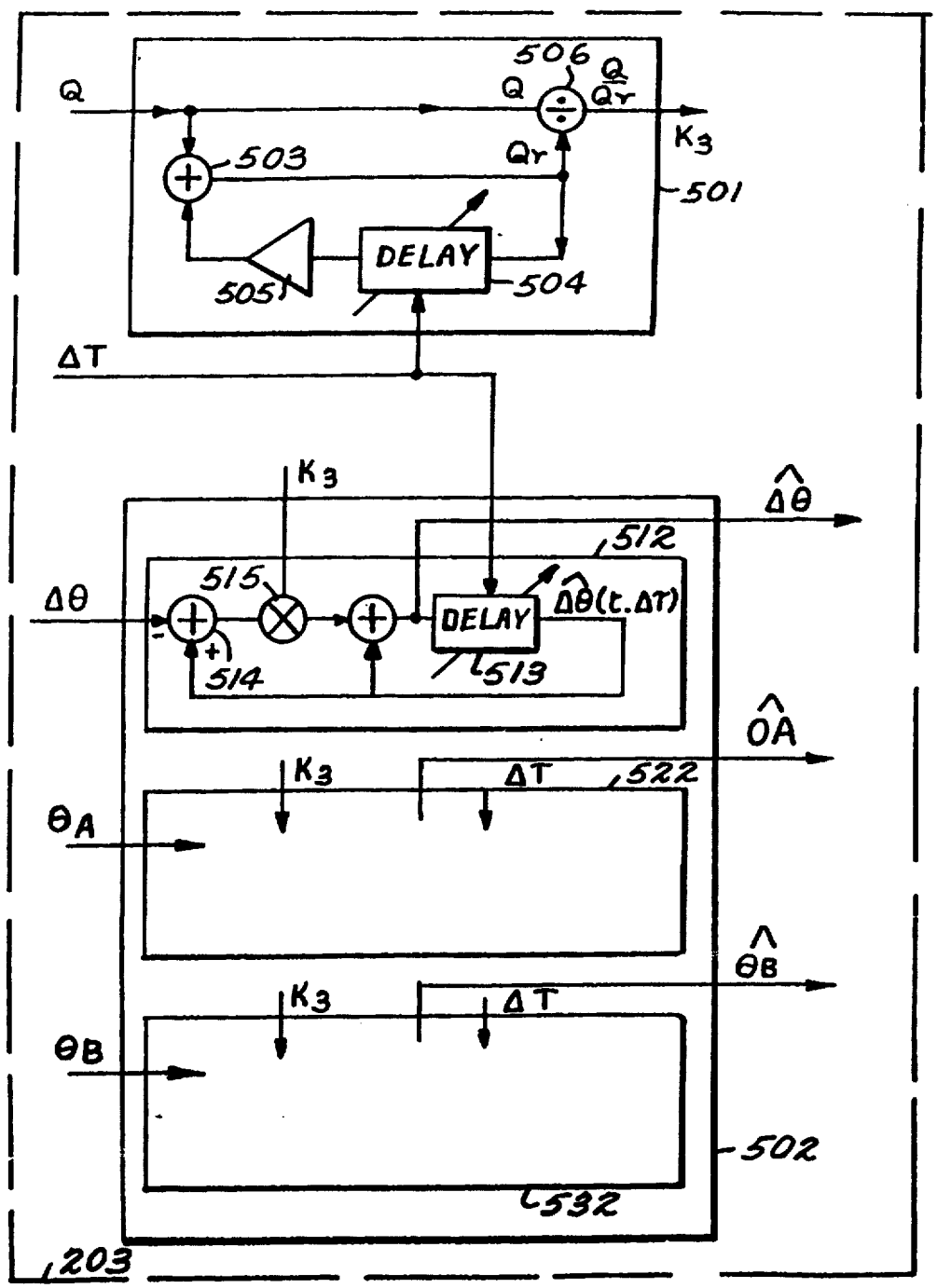
FIG. 5 represents the block diagram of the circuit 203 shown in FIG. 2.

The adaptive-filtering device 203, which is capable of delivering a filtered estimation of the values of $\Delta\theta$, $\theta_A$ and $\theta_B$ can be realized as shown by FIG. 5.

This device incorporates a first circuit 501 which, starting from the quality-coefficient Q, and from the time $\Delta T$ separating two successive extreme values, enables the gain-value $k_3$ of the adaptive filters to be calculated: It allows the measurements to be estimated.

A second circuit 502 incorporates three identical adaptive filters 512, 522 and 532, each of which permits the filtering of one of the three measurements respectively. These filters are of the type known as Kalman filters.

Describing for example the filter 512, the signal $\Delta\theta$ is received at an input, and the signal $\Delta\hat{\theta}$ is delivered at the output which represents a filtered estimated value of $\Delta\theta$. In addition, this signal $\Delta\hat{\theta}$ is applied, within the filter 512, to a variable-delay line 513, the delay produced by this delay line being controlled by the signal $\Delta T$ which represents the time separating the two previous extreme values. This delay line therefore delivers a signal $\Delta\hat{\theta}$ (t-$\Delta T$) which represents $\Delta\hat{\theta}$ at the instant $\Delta T$ earlier. The signal $\Delta\theta$ is applied to the positive input of a subtracter 514 which also receives, at its negative input, the output signal from the delay line 513. The subtracter 514 thus compares the new measurement of $\Delta\theta$, at the instant t, with the value of the estimate of $\Delta\theta$ at the instant t−$\Delta T$. The output signal from this subtracter 514 is applied to a multiplier 515, in which it is multiplied by the coefficient $k_3$ obtained by means of the circuit 501. The output signal from this multiplier is added to the output signal from the delay line 513, in an adder 516, which delivers the desired estimate value $\Delta\hat{\theta}$.

Under these conditions, the estimated value of $\Delta\hat{\theta}$ is given by the equation:

$$\Delta\hat{\theta}\,(t) = [\Delta\theta(t) - \Delta\hat{\theta}(t-\Delta T)]\,k_3(t) + \Delta\hat{\theta}\,(t-\Delta T)$$

The variable-delay line enables the effective value of the estimate obtained in respect of the preceding extreme value to be used in the calculation and not an intermediate value, since the time $\Delta T$ between these extreme values varies continuously.

This recurrence-equation can be written in the following form:

$$\Delta\hat{\theta}(t) = \Delta\theta(t) \times k_3(t) - \Delta\hat{\theta}(t-\Delta T)[1-k_3(t)]$$

which enables the effect of the coefficient $k_3$ to be taken into account more effectively.

When, at an instant T, the measurement is very good, that is to say when Q(t) is very high, $k_3(t)$ should be such that the estimate is very close to the measured value $\Delta\theta(t)$. This condition will be satisfied if $k_3$ is very nearly equal to 1.

conversely, if the measurement is very bad, corresponding to a low value of Q(t), it is necessary to minimize the weight of this measurement in the new estimate, and to maximize the previous estimate. This condition will be satisfied if $k_3$ has a value which is nearly equal to 0.

In fact the quality of the measurements varies between these two extremes and the coefficient $k_3$ is hence constrained to assume a value ranging between 0 and 1.

Since moreover the measured quantities change in the course of time, for example in accordance with the presentation of the target with respect to the antenna axis, without these changes corresponding to statistical fluctuations of the measurements, it is necessary, in the calculation of the coefficient $k_3$, to assign more importance to a recent measurement, even if of medium quality, than to an older measurement, even if the quality of the latter is very high.

In order to obtain that effect, the signal Q is applied, in the circuit 501, to one input of an adder 503. The output from this adder is applied t a delay line 504, the delay produced by this delay line being adjusted by the signal $\Delta T$, which makes it possible to take into account the measurement corresponding to the previous extreme value. The signal leaving this delay line is multiplied, by means of an amplifier 505, by a coefficient G which can vary between 0 and 1 and is then applied to the second input of the adder 503. As a result, the signal $Q_r$ leaving the adder 503 is equal to the sum of the signal Q and of all the preceding signals, each of which has been weighted by a coefficient, equal to G raised to a power corresponding to the previous rank of the signal. As G varies between 0 and 1, the influence of the earlier values of the coefficient Q dies away rapidly.

In order to satisfy the condition according to which the magnitude of the coefficient $k_3$ should be between 0 and 1, a divider 506 is used, which enables Q to be divided by $Q_r$ and which delivers the signal $k_3$.

From this description, it becomes clearly evident that the effective functioning of the whole arrangement depends on the correct selection of the instants at which the sum channel passes through the maximum and minimum values.

It is not possible to process the sum signal simply by taking the derivative and by detecting the instants at which the value of this derivative passes through 0. In practice, a system of this nature would give the real extreme values on the sum channel only if this channel were not subject to noise and such a system would be the source of significant number of errors in the case of a channel on which noise is present, which is always the situation in practice.

An example of this sum signal, subject to noise as mentioned above, is represented in FIG. 7, this signal varying between two minima, S min (t1) and S min (t9), corresponding to the instants t1 and t9. Between these minima, there is real maximum S max (t5) at the instant t5, two false maxima at the instants t3 and t8 and two false minima, at the instants t4 and t7.

Figure 6:
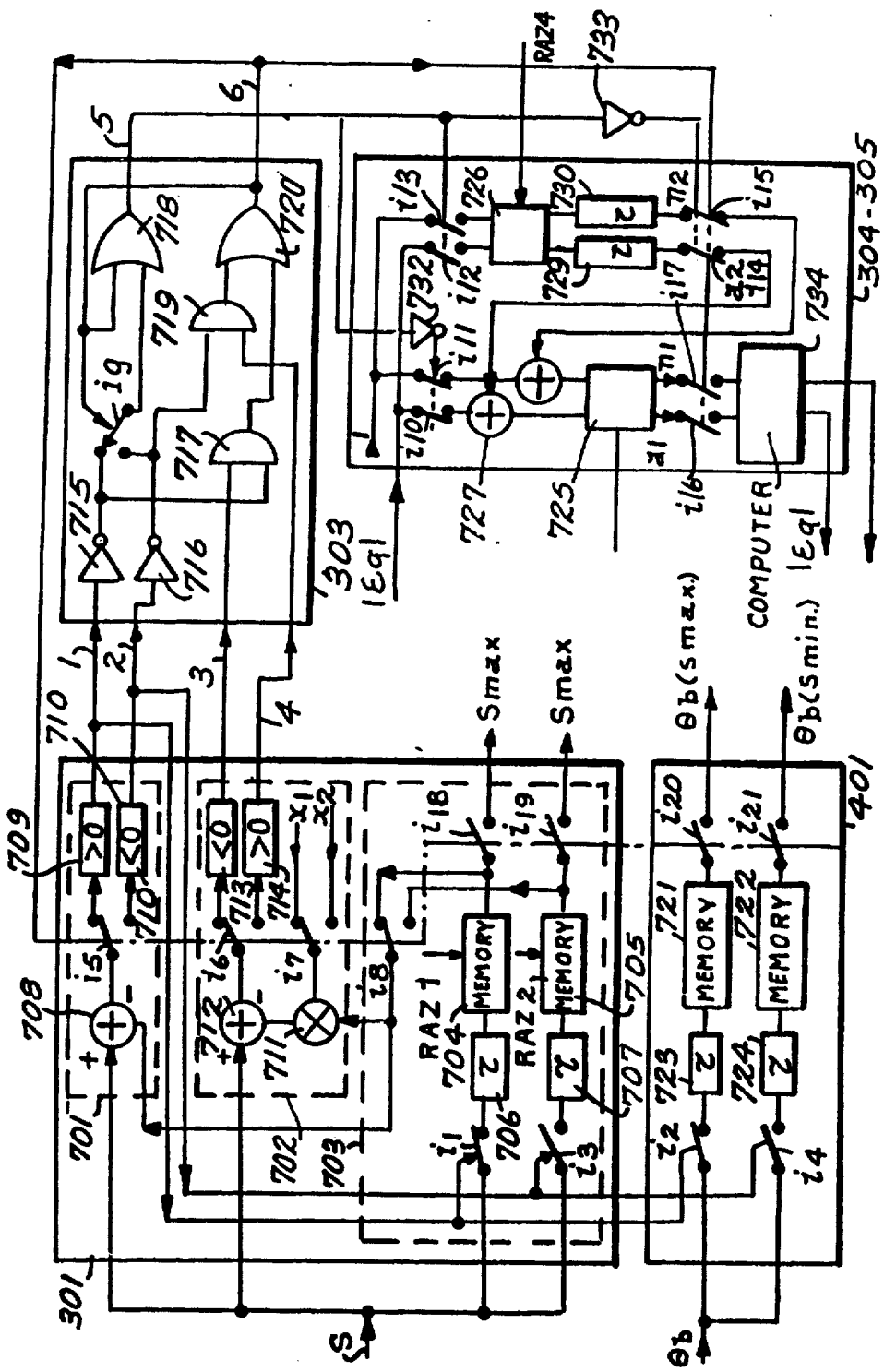
FIG. 6 represents a detailed embodiment of the circuits 301, 303, 304, 305 and 401 shown in FIGS. 3 and 4.

In order to process a signal of this nature according to the invention an arrangement as represented in FIG. 6 is used, which figure shows in detail the circuit 301, 303, 304, 305 and 401 previously described. This embodiment is described in the course of the analysis of its mode of operation in the presence of the signal represented in FIG. 7.

It is assumed that the minimum corresponding to the instant t1 has been properly detected and that the system is about to enter a phase during which it seeks the maximum S max (t5).

the transition from the phase during which the minimum is being sought, with validation of the said minimum at the instant t1, takes place, as justified later in this description, at the instant t2, which follows t1, since an extreme value cannot be detected before it has been passed, so that the observed signal has therefore undergone a certain amount of change subsequent to this extreme value. The switches are then in the state marked on Figure.

In the circuit 301 the signal S is applied to the input of a first comparator 701, of a second comparator 702 and of a double memory 703.

The first comparator 701 enables changes in the sign of the gradient of the signal on the sum channel to be detected. It incorporates a subtracter 708 which receives the signal S at its positive input and at its negative input via an switch $i_8$ the contents of a first memory 704. This memory also receives the signal S via a switch $i_1$ and a delay device 706, which applies a delay $\tau$ equal to the value of the sampling interval necessary for the calculation. This memory 704 is reset to zero at time t2 by a signal RAZ1 and its contents are then continuously updated by the signal S which is delayed by the time $\tau$.

If the gradient happens to be positive, the output from the subtracter 708 is positive and this state is detected by a positive-signal detector 709, which is connected to the subtracter 708 via an switch $i_5$. This detector 709 then supplies a logic-state "1" on the output line 1 of the circuit 301.

The comparator 701 also incorporates a negative-level detector 710, which is connected to the subtracter 708 by the switch $i_5$ when the latter has tipped and which therefore provides a logic-state "0" on the output line 2 of the circuit 301 during the process of searching for a maximum, during which process it is not connected to 708.

The second comparator 702 enables the maximum detected by the comparator 701 to be validated when S decreases following such a maximum. In order to do this, it compares the signal S with the contents of the first memory 704, which have been weighted by a coefficient X1. This coefficient is less than 1 and varies for example between 0.7 and 1, which permits validation of the detected maximum only if the signal S has decreased, relative to this maximum, by a sufficient margin. The signal from the first memory 704, available at the output of the inverter $i_8$, is applied to a multiplier 711 which receives, in addition, the value X1 via an switch $i_7$. The signal S is received at the positive input of a subtracter 712 and the output signal from the multiplier 711 is received at its negative input. The output from the subtracter 712 is applied via an switch $i_6$ to a negative-signal detector 713 which provides, in the case where this output is negative, a logic-state "1" on the output line 3 of the circuit 301.

A positive-signal detector 714 connected to the other output of the switch $i_6$ provides, when it detects a positive signal, a logic-state "1" on the output line 4 of the circuit 301 and a logic-state "0" when it is not connected. It enables the comparator 702 to validate the minimum which has been detected by the comparator 701.

The control circuit 303 incorporates two inverting amplifiers 715, whose inputs are respectively connected to the output lines 1 and 2 of the circuit 301. The output line 3 of the circuit 301 is connected to one of the inputs of an AND-gate 717 and the output line 4 is connected to one of the inputs of an AND-gate 719. The output of the inverting amplifier 715 is connected on the one hand to the other input of the gate 717 and on the other hand to one of the inputs of a switch $i_9$. The output of the inverting amplifier 716 is connected on the one hand to the other input of the gate 719 and on the other hand to the other circuit of the switch $i_9$. The outputs of the gates 719 and 717 are respectively connected to the two inputs of a first OR gate 720. The output of the switch $i_9$ is connected to one of the inputs of a second OR gate 718. The output of the first OR gate 720 is connected to the other input of the second OR-gate 718 and to the control circuit of the switch $i_9$. The output of the second OR-gate 718 corresponds to the output line 5 of the circuit 303 and the output of the first OR gate 720 corresponds to the output line 6 of this circuit.

Furthermore, the double memory 703 comprises a second memory 705 which receives the signal S via a switch $i_3$ and via a delay device 707 identical to the device 706. The switch $i_3$ is complementary to the switch $i_1$: It is open when the switch $i_1$ is closed and vice versa. The output from this memory is applied to the other input of the inverter $i_8$. The outputs from the memories 704 and 705 are likewise applied to switches $i_{18}$ and $i_{19}$, the output lines from these switches respectively delivering the signals S max and S min.

The circuit 401 incorporates two channels, which respectively comprise a memory 721, 722, which receives the signal $\theta_b$ via respectively a delay device 723, 724 identical to the device 706 and via a switch $i_2$, $i_4$, the two switches $i_2$, $i_4$ being complementary. These memories 721, 722 deliver respectively the signals $\theta_{b(S\ max)}$ and $\theta_{b(S\ min)}$ via a switch $i_{20}$, $i_{21}$.

The output line 1 of the circuit 301 triggers the switches $i_1$ and $i_2$ and the output line 2 triggers the switches $i_3$ and $i_4$.

The output line 6 of the circuit 303 triggers the switch $i_5$, $i_6$, $i_7$ and $i_8$ and the switches $i_{18}$, $i_{19}$, $i_{20}$ and $i_{21}$.

The integrating circuit 304 incorporates two double accumulators 725 and 726.

the two inputs of the accumulator 725 are respectively supplied with the output signal of two adders, 727 and 728. One of the inputs of the adder 727 receives the signal $\epsilon_q$ via a switch $i_{10}$. One of the inputs of the adder 728 receives a logic "1" via a switch $i_{11}$.

The signal $\epsilon_q$ is also applied via a switch $i_{12}$ to one of the inputs of the accumulator 726. The other input of this accumulator 726 receives the logic "1" via a switch $i_{13}$. The outputs from the accumulator 726 are respectively applied to the other input of the adders 727 and 728, via a delay device 729, 730, which is identical to the device 706, and via a switch $i_{14}$, $i_{15}$.

The outputs from the accumulator 725 are applied to a computer 734, via a switch $i_{16}$ and $i_{17}$ respectively.

This computer provides, at two outputs, the signals $\overline{|\epsilon_q|}$ and $\Delta T$ respectively.

The output line 5 of the circuit 303 controls the switches $i_{12}$ and $i_{13}$ directly, the switches $i_{10}$ and $i_{11}$ via an inverting amplifier 732 and the switches $i_{14}$ and $i_{15}$ via an inverting amplifier 733, $i_{12}$ and $i_{13}$ thus being open while $i_{10}$, $i_{11}$, $i_{14}$ and $i_{15}$ are closed and vice versa.

The output line 6 of the circuit 303 directly controls the switches $i_{16}$ and $i_{17}$.

The sequence of actions performed by the system will now be described, starting from the instant $t_2$, at which the minimum S min $(t_1)$ has been validated.

At this instant, the memory 704 has been reset to zero by the signal RAZ1, obtained, for example by derivation from the signal on the output line 4 validating the minimum at $t_1$. At the same instant too, the comparator 701 provides a logic "1" on the output line 1 and a logic "0 on the output line 2. This logic "1" in particular closes the switches $i_1$ and $i_2$, which permits the contents of the memories 704 and 721 to be continuously updated by the signals S and $\theta_b$ respectively.

In the same way the comparator 702 provides a logic "0" on the output lines 3 and 4.

The "0" state on the output line 2 keeps the switches $i_3$ and $i_4$ open, which permits the values S min $(t_1)$ and $\theta_b$ (S min) to be retained in the memories 705 and 722 respectively, this information being respectively the value of the last minimum assumed by S at $t_1$ and the corresponding value for the measured position of the target.

According to the logic states which thus exist at this moment at the inputs of the circuit 303, the output lines 5 and 6 of this circuit are in the "0" state, which fact accounts for the position of the various switches, starting from this instant $t_2$ (in reality $t_2 + \tau$, to allow for the sampling of the calculation).

During a first period, which runs from $(t_2 + \tau)$ to $t_3$, the signal S is increasing and the contents of the memory 704 are therefore always lower than S. The comparators 701 and 702 thus maintain the logic levels which are previously defined on the output lines 1 to 4 and under these conditions the switches of the arrangement remain in their previous states.

The contents on the memories 704 and 721 are therefore continuously updated, while the contents of the memories 705 and 722 remain constant and equal to the values obtained for the minimum at $t_1$.

The switches $i_{10}$, $i_{11}$, $i_{14}$ and $i_{15}$ are closed by the logic "0" on the output line 5 of the circuit 303, inverted by the inverting amplifiers 732 and 733.

The accumulators 725 and 726 have been reset to zero by the signal RAZ3 and RAZ4 respectively. As a result, the adders 727 and 728 deliver to the accumulator 725 only the signal $|\epsilon_q|$ and a logic "1" since they receive on their other input the contents of the accumulator 726, which are nil.

This accumulator 725 thus accumulates the successive values of $|\epsilon_q|$ and a sequence of logic "1"s, which serve as clock-timing marks. On its two outputs it therefore provides the signals:

$$a_1 = \int_{t_1}^{t} |\epsilon_q| dt$$

$$n_1 = \frac{t - t_1}{\tau}$$

In a second period between $t_3$ and $t_4$ the signal S decreases, from a value S max It$_3$) to a value S min ($t_4$), which corresponds to a false extreme value caused by noise. Therefore this value is not to be validated.

Under these conditions the comparator 701 detects the decreasing in the signal S and the output line 1 changes to the logic state "0". This change brings about the opening of the switches $i_1$, $i_2$ and the blocking of the contents of the memories 704, 721 at the values corresponding to the time $t_3$. the fall in the signal on the output line 1 enables a signal RAZ4 to be obtained, for example by differentiation, for resetting the accumulator 726 to zero.

This value of S, which remains constant, is utilised in the comparator 702, for being compared with the decreasing value of S. But taking the coefficient $X_1$ into account, this comparator 702 does not validate the decreasing in S and the output line 3 remains in the "0" state. As a result the output line 6 of the control circuit 303 remains in the "0" state but the output line 5 changes to the state "1", which brings about the closing of the switches $i_{12}$ and $i_{13}$ and the opening of the switches $i_{10}$, $i_{11}$, $i_{14}$ and $i_{15}$.

The contents of the accumulator 725 is not updated anymore, since the switches which supply the adders 727 and 728 are open; but in contrast the accumulator 726 receives the signals $|\epsilon_q|$ and 1 and then delivers $a_2$ and $n_2$, such that:

$$a_2 = \int_{t_3}^{t} |\epsilon_q| dt$$

$$n_2 = \frac{t - t_3}{\tau}$$

In a third period between $t_4$ and $t_5$ the signal S starts to increase again, following the false minimum S min ($t_4$), up to the true maximum S max ($t_5$).

The comparator 701, once again detecting that S is increasing, once again provides a logic "1" on the output line 1 and closes the switches $i_1$ and $i_2$ again.

The control circuit 303 reverts to its initial state. The accumulator 725 once again receives $|\epsilon_q|$ and the logic "1" and in addition, via the adders 727 and 728, the contents of the accumulator 726, which dumps the signals it has received between the instants $t_3$ and $t_4$. When this dumping operation is over, the accumulator 725 accordingly contains all the signals subsequent to the time $t_2$, without interruption between the times $t_3$ and $t_4$.

A fourth period between $t_5$ and $t_6$ is identical to the second period. It ends at that instant $t_6$ when the signal S becomes less than its value at $t_5$ multiplied by the coefficient $X_1$ which determines the discrimination threshold.

At this instant the comparator 702 tips and validates the maximum which was determined by the comparator 701 at the instant $t_5$. This validation appears as a logic "1" on the output line 3 and as a logic "1" on the output line 6 of the circuit 303.

This logic "1" on the output line 6 triggers the tipping of the inverters $i_5$, $i_6$, $i_7$ and $i_8$, for setting the circuit 301 into a configuration which now permits it to detect the minimum following the maximum.

This logic "1" also triggers the temporary closing of the switches $i_{18}$ to $i_{21}$, which enables the signals S max, S min, $\theta_b$ (S max) and $\theta_b$ (S min) to be obtained on the output lines from the circuits 301 and 401.

Finally this logic "1" permits the closing of the switches $i_{16}$ and $i_{17}$ which enable the contents of the accumulator 725 to be dumped into the computer 734. This computer which is for example a suitably programmed microprocessor Type 6800 initiates the calculations defined by the formulae:

$$\Delta T = n_1 \tau$$

$$|\epsilon_q| = \frac{a_1}{\Delta T}$$

these calculations starting from the values of $a_1$ and $n_1$ defined over the time interval $t_1$ to $t_5$.

The result of these calculations is available on the output lines from the circuit 304–305, with the corresponding values of S and $\theta$ on the output lines from the circuits 301 and 401. This same group of signals is supplied to the other circuits of the arrangement in order to calculate the target parameters.

The tipping of the inverters restores at the inputs of the control circuit 303 the logic states which, having regard to the tipping of the inverter $i_9$ incorporated within this circuit, place the circuit in its initial state at the instant $t_2$ when the minima corresponding to the instant $t_1$ has been validated; that is to say the state in which a logic "0" is present on the output lines 5 and 6. However, this tipping is sufficiently slow to enable the accumulator 725 to dump into the computer 734 and to permit the calculations to be performed inside the latter, as well as to take account of the signals on the output lines of the circuits 301 and 401.

Under these conditions the output line 6 opens the switches $i_{16}$ or $i_{21}$ again, which operation stops the transmission of the signals representing the parameters which were determined from the maxima. The fall in this signal is also used to obtain, for example by differentiation, the signal RAZ3 for resetting the accumulator 725 to zero.

The fall in the signal on the output line 5 opens the switches $i_{12}$ and $i_{13}$ again, and closes the switches $i_{10}$, $i_{11}$, $i_{14}$ and $i_{15}$ again. As a result, the accumulator 725, which has just been reset to zero, receives the contents of the accumulator 726, corresponding to the changes in S between the instants $t_5$ and $t_6$, and starts once again to receive from this instant $t_6$ the signals $|\epsilon_q|$ and logic "1". Its contents will therefore be complete from the maximum to the next minimum. This proves in particular that the contents of this assumulator at the instant $t_2$ certainly included the signals corresponding to the interval between the instant $t_1$ and $t_2$ since the phenomena had been identical at the time of the confirmation of the minimum at $t_1$, which was effected at the instant $t_2$.

The arrangement is therefore in the state for detecting the next minimum at $t_9$ by monitoring the difference between the instantaneous signal S and this same signal delayed now contained in the memory 705, which is supplied via the switch $i_3$ now closed, whereas the memory 704 contains S max ($t_5$), since the switch $i_1$ is then open. For this purpose, the comparator 701 uses the negative-signal detector 710.

The false minimum at the instant $t_7$ is eliminated by the comparator 702, which uses the positive-signal detector 713. In order to accomplish this, as the values of S are changing conversely it is necessary, in order to eliminate the false minimum at $t_7$, to use a threshold $X_2$ which on this occasion is greater than 1 and which in practice has a value between 1 and 1.5.

During the following phases the system therefore functions in the same way up to the instant $t_9$ at which it returns to the starting phase corresponding to the instant $t_1$.

Compared to the known antiglint device, which yields only one measurement of the position of the center of mass of the target, the invention enables an estimation of the position of the external boundaries of the target to be obtained, whatever the composition of the target may be.

Thus FIG. 8 represents the results obtained for a target comprising three bright points, $P_1$, $P_2$ and $P_3$ which have a reflection coefficient respectively equal to 1, 0.3, 0.5. These three bright points are situated along a length of five metres, at positions which have been marked on the ordinate axis of the graph at the bottom of the Figure, in relation to their center of mass placed at the origin of the axis. A perturbing point $P_4$ possessing a reflection coefficient of 0.15 is also present. The two graphs at the top of the Figure represent respectively the fluctuations on the sum channel S and on the angle-error-measurement channel $\epsilon$, as a function of time. It shows that the channels are highly perturbed, which is normal.

An antiglint device would provide the position of the center of mass, that is to say the abscissa axis of the graph at the bottom. The arrangement according to the invention makes it possible to obtain, starting from the measurements corresponding to the two other graphs, the estimated external boundaries, H and B, of the target, in the case of a single plane to which our description has bee restricted. It is understood that the invention can also be used in a perpendicular plane, which permits the boundaries of the entire target to be defined in space. As can be appreciated from the graph this estimate fluctuates slightly about the effective position of the points $P_1$ and $P_3$. This effectively shows that the arrangement permits these external boundaries to be determined in a manner which is only very weakly influenced by the bright points in the interior, irrespective of whether they are real, such as $P_2$, or whether they are perturbing point, such as $P_4$.

It is clear that the results which have been obtained in this way do not yield the whole of the information which would be useful for obtaining complete knowledge of the target. Depending on whether for example this target represents a single aircraft, a pair of aircrafts, or a complete squadron, the actions to be taken in practice would not be the same.

Nevertheless complementary information regarding the composition of the target is frequently available from other sources and the results provided by the invention usefully supplement such information.

thus, in the case of a single aircraft, the center of mass which is indicated by the antiglint device is often extremely asymmetric with respect to the physical center of this target. Thus, on approaching from the rear, the center of mass is in the region of the jet engine, while in the case of a head-on approach, it is in the region of the cock-pit, although the aiming point, for example in the event of opening fire, is very obviously located at the geometrical center of the aircraft. Starting from the external boundaries of the aircraft, our arrangement thus makes it possible to determine this geometrical center.

In the case where it is known that the situation involves two aircrafts flying company, it is of course of prime importance to track them separately, which can be done by means of our invention, and not to shoot between them two.

Finally when a target has been detected which is manoeuvring close to the ground or to the sea—which is easy to know—the reflection of the waves from the ground or from the sea gives rise to a well-known image-effect which causes, in the case of an antiglint device, a point located on the surface of the earth halfway between the aircraft and its image to be detected. In this case, our arrangement permits the determination of the position of the aircraft and of its image, and it is easy to discriminate between them, bearing in mind that the image is at a negative altitude.

These results could possibly have been obtained by means of a device capable of a high spectral resolution, such as a bank of filters, by carrying out for example Fourier transformations. However, a device of this nature would be of a complexity out of all proportion to our arrangement, and could be embodied only with difficulty. Moreover the position of all the bright points would be obtained and it would be necessary to interpret them in accordance with criteria which would be very tricky to implement.

What is claimed is:

1. A method for improving the angular resolution of a monopulse radar, in which the monopulse signals used by the radar for detecting a target are processed in order to obtain a sum-signal (S), a direction-signal ($\theta_b$) and a signal representing the quadrature angle-error measurement $|\epsilon_q|$, comprising the following steps in order to obtain a signal $\Delta\theta$ which measures the wing-span of the target:

detecting a first and a second successive extreme values (S max and S min) of the sum-signal (S);

measuring the time interval ($\Delta T$) between the instants when the two extreme values occur;

integrating the quadrature angle-error signal $|\epsilon_q|$ over the time interval ($\Delta T$);

dividing by the time interval ($\Delta T$) the result of this integration, in order to obtain the mean value of the quadrature angle-error signal $|\epsilon_q|$, namely $\overline{|\epsilon_q|}$, over the time interval ($\Delta T$);

calculating a coefficient $$k_1 = \frac{\pi}{Ln\left(\frac{S\,max}{S\,min}\right)}$$

Ln denoting the Neperian logarithm; and multiplicating the coefficient $k_1$ by the means value $\overline{|\epsilon_q|}$ which operation yields the value of the wing-span $\Delta\theta$ of the target.

2. A method according to claim 1, wherein in order to obtain two further signals ($\theta_A$ and $\theta_B$), which measure the respective direction of bright points on the exterior of the target, it further comprises the following operation:

storing a first and a second value $\theta_{b(S\,max)}$ and $\theta_{b(S\,min)}$ assumed by the direction signal $\theta_b$ at the instants when the sum-signal (S) assumes the first and second extreme values (S max and S min) respectively;

comparing the first and second values ($\theta_{b(S\,max)}$ and $\theta_{b(S\,min)}$) of the direction signal, in order to obtain a unitary variable (s) which is equal to +1 if the first value of the direction signal exceeds its second values and to −1 if the opposite occurs;

dividing the lower extreme value (S min) of the sum-signal by its higher extreme value (S max) and multiplying this ratio by the unitary variable (s) and by 0.5;

subtracting, from a signal having a value of 0.5., of the result of the preceding multiplication, in order to obtain a second coefficient ($k_2$);

multiplying the wingspan ($\Delta\theta$) of the target by the second coefficient ($k_2$);

adding the first value of the direction-signal, which corresponds to the maximum value of the sum-signal, to the result ($k_2 \cdot \Delta\theta$) of the preceding multiplication, the result of the addition being the first further signal ($\theta_A$); and subtracting from the first signal ($\theta_A$) the value ($\Delta\theta$) of the wingspan of the target, the result of the subtraction being the second further signal ($\theta_B$).

3. A method according to claim 1, wherein in order to further obtain a quality-coefficient (Q) in respect of the measurements which have been performed, it further comprises the following operations:

dividing the first extreme value of the sum signal by its second extreme value;

multiplying by the first extreme value of the sum signal the result of the preceding division, which operation yields the quality coefficient (Q).

4. A method according to claim 3, wherein in order to obtain an adaptively-filtered estimate of the measurements which have been performed it further comprises the following operations:

adding to the quality coefficient Q, a feedback signal, in order to obtain a signal $Q_r$;

delaying this signal $Q_r$ by a value equal to the time interval ($\Delta T$);

multiplying the delayed signal by a coefficient (C) which is comprised between 0 and 1, which operation yields the feedback signal;

dividing the quality coefficient Q by the signal $Q_r$, in order to obtain a third coefficient ($k_3$);

and, on the measuring signal which is to be filtered:
subtracting, from the measuring signal, an estimated, delayed measuring signal;

multiplying the result of this subtraction, by the third coefficient ($k_3$);

adding, to the result of the preceding multiplication the estimated, delayed measuring signal, which operation yields the estimated measuring signal;

delaying this estimated measuring signal, by a time equal to the time interval ($\Delta T$), which operation yields the estimated, delayed measuring signal.

5. An arrangement for improving the angular resolution of a monopulse radar receiver which from the signals reflected by a target supplies a sum signal (S), a signal ($\theta_b$) representing the direction of the target relatively to a fixed reference axis (OX) and a signal $|\epsilon_q|$ representing the quadrature angle-error measurement relatively to the antenna axis, said arrangement comprising a device (201) which delivers a signal ($\Delta\theta$) representing the wingspan of the detected target and which is composed of:

means (301) for detecting and supplying two successive extreme values, a higher value (S max) and a lower value (S min) of the sum signal (S) with which it is fed;

means (302) for calculating a coefficient $$k_1 = \frac{\pi}{Ln\left(\frac{S\,max}{S\,min}\right)}.$$

from the two successive extreme values of the sum signal supplied by the detecting means, Ln denoting the function "Neperian Logarithm";

control means (303) for generating first and second control signals which synchronize the detecting means (301) and a means (304) for integrating the quadrature angle-error signal ($|\epsilon_q|$) over a time interval ($\Delta T$) between the instants when the higher and the lower extreme value of the sum signal respectively occur, which integrating means (304) also supplying a signal representing the time interval ($\Delta T$);

a second means (305) for calculating the mean value $\overline{|\epsilon_q|}$ of the quadrature angle-error signal in the time interval ($\Delta T$); and a third means (306) for calculating the product ($\Delta\theta$) of the mean value $\overline{|\epsilon_q|}$ of the quadrature angle-error signal and of the coefficient ($k_1$) from the first calculating means (302).

6. An arrangement according to claim 5, wherein for measuring the direction of two bright points (A, B) of the target with respect to the fixed reference axis (OX), it further comprises a second device (202) which is composed of:

first means (401) for storing the values of the direction ($\theta_b$) of the detected target and, when controlled by the first signal supplied by the control means (303) of the first device (201), for delivering first and second values of said direction ($\theta_b$) corresponding respectively to the higher and lower extreme values of the sum signal (S) detected in the first device;

second means (402) for comparing the first and second values of the direction ($\theta_b$) which are supplied by the storing means (401) and for delivering a signal (s) which is equal to:
 +1, if the first value is higher than the second value
 −1, if the first value is lower than the second value a third means (403) for calculating, from the output signal (s) of the comparing means (402) and from the higher and lower extreme values of the sum signal (S) supplied by the detecting means (301) of the first device (201), a second coefficient:

$$k_2 = i\left[1 - \frac{S\,min}{S\,max} \cdot s\right]$$

and
for calculating a quality coefficient (Q) which qualifies the measurement of the wingspan ($\Delta\theta$) of the target carried out by the first device (201), such that Q=S max, where S max is the higher extreme value and S min is the lower extreme value of the sum signal;

fourth means (404) for calculating and delivering the respective direction ($\theta_A$, $\theta_B$) of the two bright points (A, B) at the respective extreme limits of the target, which means being supplied with the second coefficient ($k_2$) from the third calculating means (403), with the value of the direction ($\theta_b$) of the target, which corresponds to the higher extreme value of the sum signal (S) and which is delivered by the storing means (401), and with the wingspan ($\Delta\theta$) of the target which is delivered by the first device (201).

7. An arrangement according to claim 6, wherein it further comprises a third device (203) for adaptively filtering the measurements carried out by the first and eventually second device, said third device comprising:

means (413, 453, 463) for calculating a quality coefficient (Q) which qualifies the measurement of the wingspan ($\Delta\theta$) of the target carried out by the first device (201) and eventually the measurement of the direction ($\theta_A\theta_B$) of the two extremes bright points (A, B) of the target carried out by the second device (202), which means (413, 453, 463) being supplied with the higher (S max) and lower (S min) extreme values of the sum signal and delivering the quality coefficient $$Q = \frac{(S\,max)^2}{(S\,min)}$$

means (501) for calculating a third coefficient ($k_3$) which is comprised between 0 and 1, which means (501) being supplied with the quality coefficient (Q) from the means (413, 453, 463) and with the time interval ($\Delta T$) from the integrating means (304) of the first device (201); and adaptive filtering means (512, 522, 532) supplied with the time interval ($\Delta T$) from the integrating means (304), with the third coefficient ($k_3$) and respectively with the output signal ($\Delta\theta$ and $\theta_a$, $\theta_B$) from the first device (201) and eventually from the second device (202), which filtering means (512, 522, 532) delivering an estimated value ($\Delta\theta$; and $\theta_A$, $\theta_B$) of the measurement to be filtered.

8. An arrangement according to claim 5, wherein the detecting means (301) comprises:

a first memory (704), for receiving the sum signal (S) via a first switch ($i_1$) and a first delay device (706);

a second memory (705) for receiving the sum signal (S) via a second switch ($I_3$) and a second delay device (707);

a first comparator (701), comprising a subtracter (708) which receives at its positive input the sum signal (S) and at its negative input, via a first inverter ($i_8$), the contents of the first memory (704) or of the second memory (705); a positive-signal detector (709) which is connected, via a second inverter ($i_5$), to the output of the subtracter (708) and which delivers, at a first output line (1), a binary signal assuming the value "1" when a positive signal is detected and controlling the first switch ($i_1$); and a negative-signal detector (710), which is connected, by the second inverter ($i_5$) to the subtracter (708), and which delivers, at a second output line (2), a binary signal assuming the value "1" when a negative signal is detected and controlling the second switch ($i_3$); and a second comparator (702), comprising a subtracter (712), which receives at its positive input, the sum signal (S); a multiplier (711) which multiplies the signal delivered by the first inverter ($i_8$) by a coefficient ($X_1$) between 0 and 1, or by a coefficient ($X_2$) higher than 1, these coefficients being selected by means of a third inverter ($i_7$), and which delivers the result of this multiplication to the negative input of the subtracter (712); a negative-signal detector (713) which is connected, via a fourth inverter ($i_6$), to the output of the subtracter (712), and which delivers, at a third output line (3), a binary signal assuming the value "1" when a negative signal is detected; and a positive-signal detector (714), which is connected via the inverter ($i_6$), to the output of the subtracter (712), and which delivers, at a fourth output line (4), a binary signal assuming the value "1" when a positive value is detected; the first, second, third and fourth inverters ($i_8$, $i_5$, $i_7$, $i_6$) being controlled by the first control signal from the control means (303).

9. An arrangement according to claim 8, wherein the control means (303) comprises:

a first inverting amplifier (715) the input of which is connected to the first output line (1) of the detecting means (301);

a second inverting amplifier (716), the input of which is connected to the second output line (2) of the detecting means (301);

a first AND gate (717), the first and second inputs of which are respectively connected to the output of the first inverting amplifier (715) and to the third output line (3) of the detecting means (301);

a second AND gate (719), the first and second inputs of which are respectively connected to the output of the second inverting amplifier (716) and to the output line (4) of the detecting means (301);

a first OR gate (718), a first input of which is connected, via a fifth inverter ($i_9$) to the output of the first or of the second inverting amplifier (715 or 716) and the output (5) of which delivers a binary signal as the second control signal; and a second OR gate (720), a first input of which is connected to the output of the first AND gate (717), a second input of which is connected to the output of the second AND (719) and the output line (6) of which is connected to the second input of the first OR gate (718) and to the control-input of the inverter ($i_8$), and delivers a binary control signal as the first control signal for controlling the first, second, third and fourth inverters ($i_8$, $i_5$, $i_7$, $i_6$) of the detecting means (301).

10. An arrangement according to claim 5, wherein the integrating means (304) comprises:

a first double accumulator (725), for receiving the signal $|\epsilon_q|$ via a first adder (727) and a first switch $i_{10}$) and for receiving a logic "1", via a second adder (728) and a second switch ($i_{11}$);

a third switch and an fourth switch $i_{12}$, $i_{13}$) which are controlled by the second control signal from the control means (303) and deliver respectively the signal $|\epsilon_q|$ and the logic "1" to a second double accumulator (726);

a fifth switch and a sixth switch ($i_{14}$, $i_{15}$) for receiving the contents of the second accumulator (726) via respectively a third delay device and a fourth delay device (729, 730) and for delivering these contents to the first and second adders (727, 728) respectively;

a first inverting amplifier (732), the input of which receives the second control signal from the control means (303) and the output of which controls the first and second switches;

a second inverting amplifier (733) the input of which receives the second control signal from the control means (303) and the output of which controls the fifth and sixth switches;

a computer (734) for receiving the contents of the first double accumulator via respectively a seventh switch and an eight switch ($i_{16}$, $i_{17}$), which are controlled by the first control signal, and for calculating and delivering time interval signal ($\Delta T$) starting from the score of logic "1"s contained in the first accumulator, and the signal $|\epsilon_q|$ by summing the signals $\overline{|\epsilon_q|}$ over the time interval ($\Delta T$).

11. An arrangement according to claim 6, wherein the storing means (401) comprises:

a first memory (721) for receiving the direction signal ($\theta_b$) via a first switch ($i_2$) and a first delay circuit (723); and a second memory (722) for receiving the direction signal ($\theta_b$) via a second switch ($i_4$) and a second delay circuit (724); the first and second switches ($i_2$, $i_4$) being so controlled that the first and second memories (721, 722) deliver the values of the direction signal $Q_b$ which correspond respectively to the higher and lower extreme values of the sum signal (S).

12. An arrangement according to claim 6, wherein the third calculating means (403) comprises:

a divider (413) for delivering the ratio of the lower extreme value to the higher extreme value of the sum signal (S) which have been applied to its two inputs respectively;

a first multiplier (423) which receives at a first input an external signal equal to 0.5 and at a second input the output signal (s) of the comparing means (402);

a second multiplier (433) which receives at a first input the output signal of the first multiplier (423) and at a second input the output signal of the divider (413) and which supplies the negative input of;

an adder (443) to the positive input of which an external signal equal to 0.5 is applied and the output of which supplies the second coefficient ($k_2$).

13. An arrangement according to claim 6, wherein the fourth calculating means (404) comprises:

a multiplier (414) which receives on a first input the second coefficient supplied by the third calculating means (403) and on a second input the signal ($\Delta\theta$) representing the wingspan of the target and delivered by the first device (201);

a first adder (424) receiving on a first input the output signal of the multiplier (414) and on a second input from the storing means (401) the value of the direction signal ($\theta_b$), which corresponds to the higher extreme value of the sum signal (S), and delivering a signal ($\theta_A$) which represents the direction of the first extreme bright point (A) of the target; and a second adder (434) receiving on a positive input the output signal of the first adder (424) and on a negative input the signal ($\Delta\theta$) which represents the wingspan of the target and which is supplied by the first device (201) and delivering a signal ($\theta_B$) which represents the direction of the second extreme bright point (B) of the target.

14. An arrangement according to claim 7, wherein the third coefficient calculating means (501) comprises:

a divider (506) which receives on a first input the quality coefficient (Q) supplied by the quality sixth coefficient calculating means (413, 453, 463) and on a second input the output signal ($Q_r$) or an adder (503) which is supplied on a first input with the quality coefficient (Q) from the sixth calculating means (463) and, via a delay circuit (504) and an amplifier (505) with its own output signal ($Q_r$), the delay applied by the delay circuit (504) being equal to the time interval ($\Delta T$) supplied by the integrating means (304) of the first device and the divider (506) delivering a signal which is equal to the ratio of the quality coefficient (Q) to the output signal ($Q_r$) of the adder (503) and which represents the third coefficient ($k_3$).

15. An arrangement according to claim 7, wherein the adaptive filtering means (512, 522, 532) relative to each measurement to be filtered comprises in series:

a first adder (514) which receives on a negative input the measurement to be filtered ($\Delta\theta$, $\theta_A$, $\theta_B$) and on a positive input via a delay circuit (513), the filtered measurement ($\Delta\theta$, $\theta_A\theta_B$) delivered by the filtering means;

a multiplier (515) supplied with the third coefficient ($k_3$) from the seventh third coefficient calculating means (501) and with the output signal of the first adder (514); and a second adder (516) which receives on a first input the output signal of the multiplier (515) and on a second input the delayed filtered measurement from the output of the delay circuit (513); the delay circuit (513) applying a delay equal to the time interval ($\Delta T$).

* * * * *